United States Patent [19]

Nakayama

[11] Patent Number: 4,616,357
[45] Date of Patent: Oct. 7, 1986

[54] DISC PLAYER

[75] Inventor: Mitsuhisa Nakayama, Kanagawa, Japan

[73] Assignee: U.S. Philips Corporation, New York, N.Y.

[21] Appl. No.: 675,494

[22] Filed: Nov. 28, 1984

[30] Foreign Application Priority Data

Dec. 7, 1983 [JP] Japan .................. 58-188122

[51] Int. Cl.⁴ .................. G11B 17/04; G11B 17/26
[52] U.S. Cl. .................. 369/194; 369/36; 369/75.2; 369/270
[58] Field of Search .................. 369/34, 36, 38, 194, 369/75.2, 270

[56] References Cited

U.S. PATENT DOCUMENTS

| 2,891,797 | 6/1959 | Hull et al. | 369/192 |
| 4,170,030 | 10/1979 | Castrodale et al. | 369/38 |
| 4,332,025 | 5/1982 | Thurston | 369/270 |
| 4,479,210 | 10/1984 | Nakayama | 369/194 |
| 4,481,618 | 11/1984 | Nakayama | 369/75.2 |
| 4,499,573 | 2/1985 | Morinaga | 369/270 |

FOREIGN PATENT DOCUMENTS 2112994 7/1983 United Kingdom .

Primary Examiner—Steven L. Stephan
Attorney, Agent, or Firm—David R. Treacy

[57] ABSTRACT

A disc player includes a loading device for loading an information disc on the turntable of the player. The loading device comprises a frame and a loading support for supporting the disc, which loading support is movable horizontally and vertically to transfer a disc to the turntable. The player further comprises a pressure member mounted on a pressure member support for urging the loaded disc into a centered position on the turntable. The pressure member support bears on the loading support under the influence of springs in a manner permitting horizontal movement of the loading support relative to the pressure member support. The pressure member support is slidably guided for movement in the vertical direction to urge the disc onto the turntable by guide means provided on the frame.

8 Claims, 8 Drawing Figures

DISC PLAYER

BACKGROUND OF THE INVENTION

The invention relates to a disc player with a loading device for loading an information disc on the turntable of the player, the loading device comprising a frame and a loading support for supporting the disc, which loading support is movable horizontally and vertically to transfer a disc to the turntable.

A disc player with a loading device of this construction is described in British Pat. Spec. No. 2,112,994A.

In a disc player in which the turntable rotates at high speed, for example, a player for playing optical audio discs such as those known as "Compact Discs", it is necessary to employ a pressure member for urging the disc into a centered position on the turntable while the turntable is rotating. The known disc player does not have such a pressure member.

SUMMARY OF THE INVENTION

It is an object of the invention to provide a disc player having a loading device of the above construction with a simple pressure member, which can be used in cooperation with a horizontally and vertically movable loading support. The disc player according to the invention is characterized in that the player comprises a pressure member, mounted on a pressure member support, for urging in an operative position, the loaded disc into a centered position on the turntable, said pressure member support bears on the loading support under the influence of spring means in such a way as to permit horizontal movement of the loading support relative to the pressure member support, said pressure member support is slidably guided for movement in the vertical direction to the operative position by guide means, being provided on the frame.

With this arrangement there is no need to provide a separate means for moving the pressure member to the operative position, since this is done by the cooperation of the pressure member support with the loading support as it moves downwards to load the disc on the turntable. The return movement of the pressure member can also be carried out by the loading support during its unloading movement. So the extent of movement of the pressure member support is minimized and the space, which is required for the pressure member and its support, can be reduced. By the guide means, guiding the pressure member support in vertical direction, it can be achieved that the vertical pressure force of the pressure member to the disc is located coaxially with the axis of the turntable, so that the disc is accurately centred and urged to the turntable.

A preferred embodiment of the invention is characterized in that said pressure member support comprises vertically extending members which are sliadable guided by said guide means.

This provides a construction of which the pressure member support is accurately guided in vertical direction. The slidable guided members of the pressure member support reduce the noise during the action of the pressure member for urging the disc against the turntable.

Another preferred embodiment of the invention is characterized in that said pressure member support is U-shaped, the pressure member being mounted on a transverse portion of said U-shaped support, limbs of said support comprise the vertically extending members which at the bottom of said limbs bear on the loading support. This provides an accurate linkage between the pressure member and the loading support. Rods may be mounted on the transverse portion of said U-shaped support and said spring means may comprise springs, being located around said rods. So the springs urging the limbs on the loading support may reduce the shocks caused during the movement of the pressure member and its support in the direction of the turntable.

BRIEF DESCRIPTION OF THE DRAWINGS

An embodiment of the invention will now be described with reference to the accompanying drawings, in which.

DESCRIPTION OF THE PREFERRED EMBODIMENT

Figure 1:
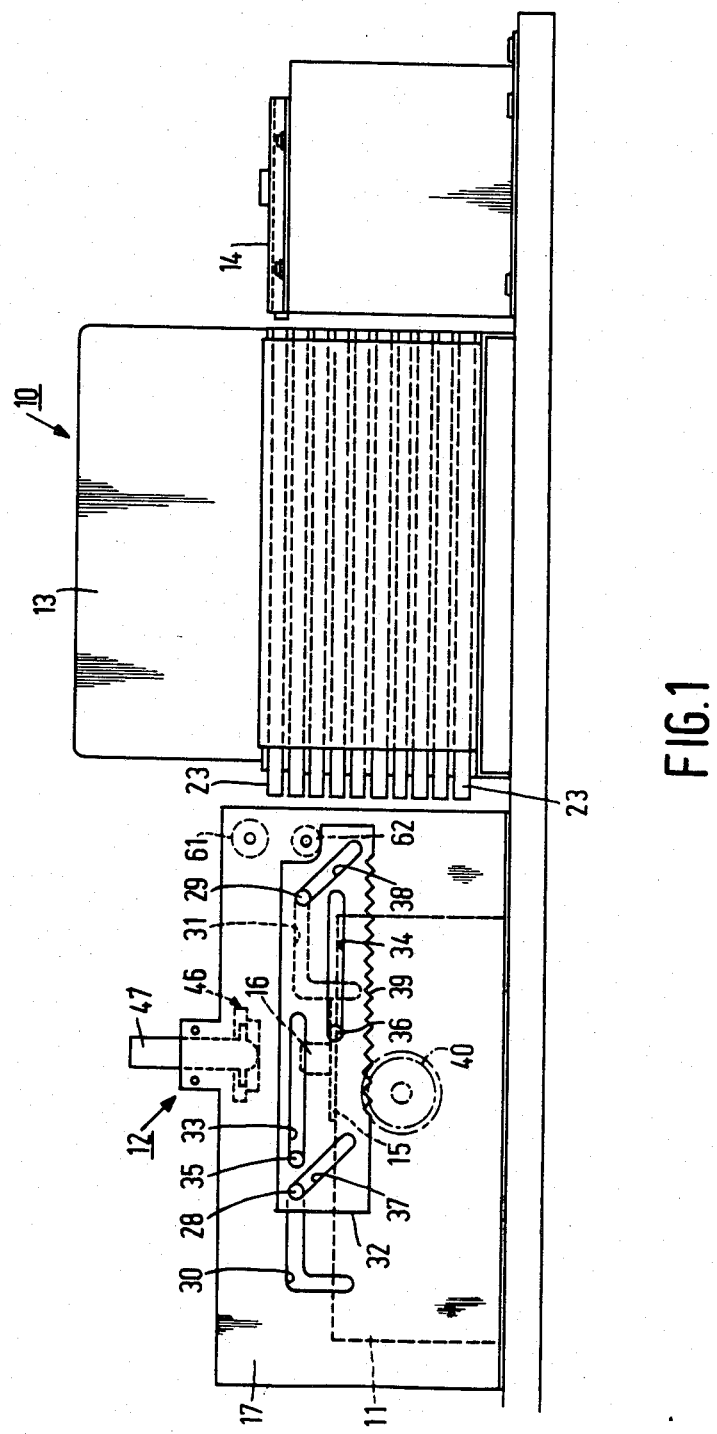
FIG. 1 is an elevation of an automatic record-disc changer.

The disc changer shown in the drawings includes a player 10 for playing optical audio discs, for example those known as "Compact Discs". The player 10 comprises a loading device 12 which is mounted on a player body 11, an elevator 13 which is arranged adjacent to the side of the player body 11 and a carrier 14 which is established adjacent to the side of the elevator 13 (see FIGS. 1 and 2).

Figure 4:
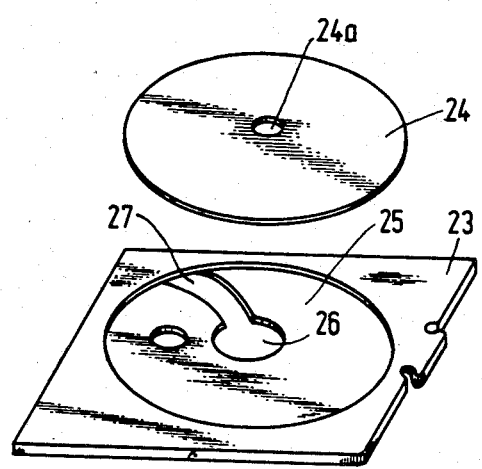
FIG. 4 is a perspective view of a disc and one of the disc holders of the disc changer.
Figure 5:
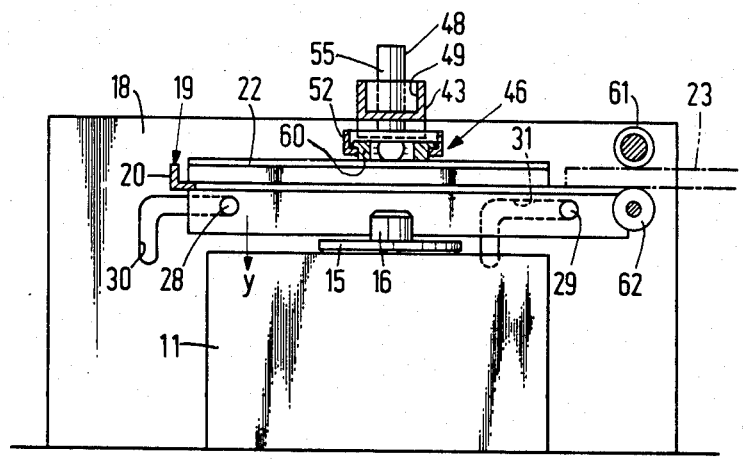
FIG. 5 is a sectional view taken on the line V—V in FIG. 3.

A turntable 15, on which a disc 24 shown in FIG. 4 is loaded, is located in the upper middle part of the player body 11. A position determining pin 16 protrudes coaxially with and above the turntable 15. The position determining pin 16 is inserted into the central hole 24a of the disc 24 which is being loaded onto the turntable 15 so that the disc 24 is engaged coaxially on the position determining pin 16 and thereby made to rotate coaxially.

Figure 2:
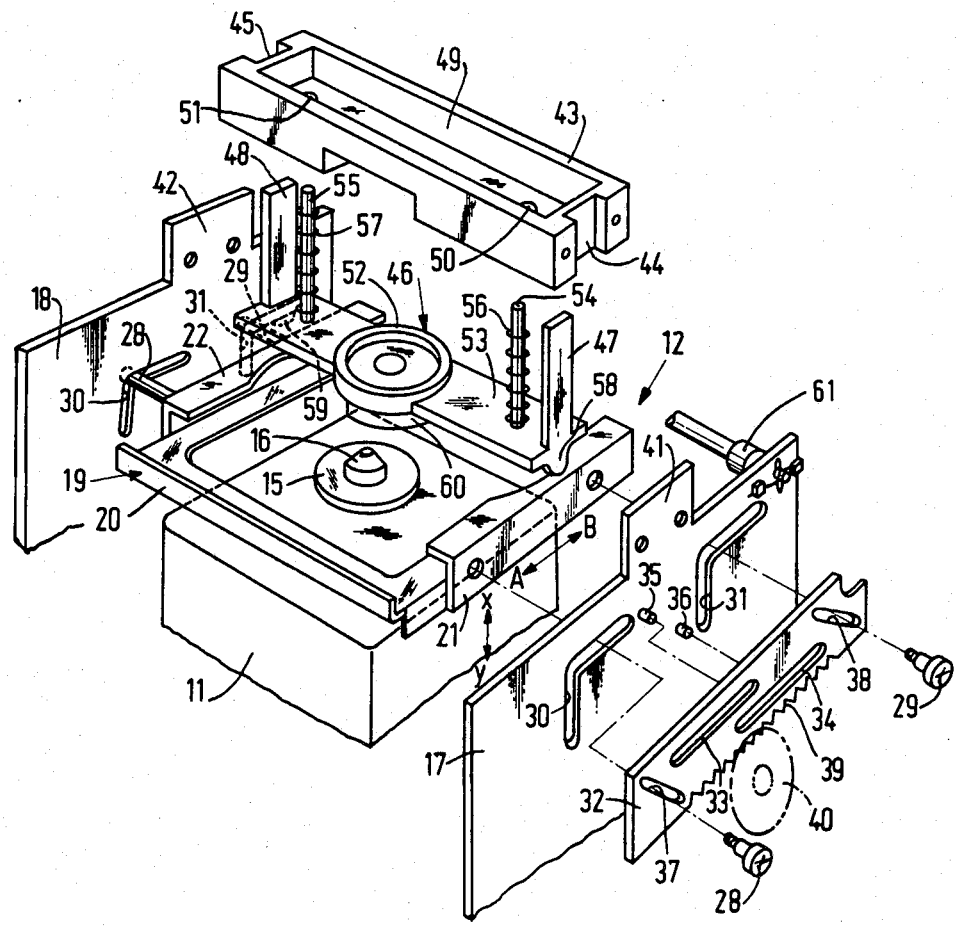
FIG. 2 is an exploded oblique view of a part of this disc changer, showing the loading device.
Figure 3:
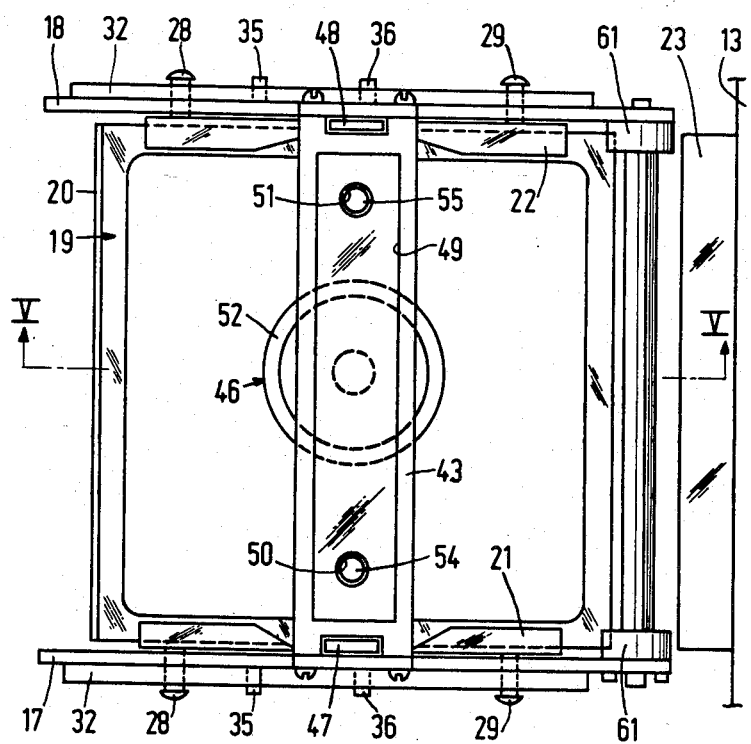
FIG. 3 is a plan view of the part shown in FIG. 2.

The loading device 12 comprises a frame 17, 18 (see also FIG. 3) which straddles the player body 11, and a loading support 19 for carrying a disc holder 23 which is shown in FIG. 4. The loading support 19 is arranged to be movable within the frame 17, 18 and above the player body 11. The loading support 19 takes up the disc holder 23, which can be pushed out from the elevator 13 and moved horizontally into a position above the player body 11. The support 19 is in the form of a square frame and a stopper 20 is arranged on the side away from the elevator 13 as shown in FIG. 2 so as to control the extent to which the disc holder 23 can slide on the loading support 19. L-shaped guides 21, 22 are arranged protruding from the sides of the support 19 which are adjacent to the frame 17, 18 and these guides guide the holder 23 as it is being slid along the top of the loading support.

The disc holder 23 is in the form of a square plate as shown in FIG. 4 and the holer has a circular depression 25, which houses the disc 24. A slit 27 and a circular hole 26, which has a larger diameter than the turntable 15, are formed in the middle part of the circular depression 25.

Two sliding pins 28, 29 are arranged, protruding from the loading support 19 towards the frame 17, 18 respectively. These sliding pins 28, 29 are fitted into guide slots 30, 31, which are arranged in the frame 17, 18. The guide slots 30, 31 are located horizontally and away from the side on which the elevator 13 is located they bend round and extent vertically downwards. Hence when the sliding pins 28, 29 are moved and guided by the guide slots 30, 31 the disc holder 23 is moved horizontally together with the loading support 19 to a position above the position determining pin 16 on the player body, then the disc holder 23 descends and is loaded onto the player body 11 in such a way that the disc 24 which is on the tray 23 is loaded onto the turntable, with the position determining pin 16 inserted into its central circular hole 24a.

Two drive plates 32, 32 are arranged respectively on the outsides of the frame 17, 18. These drive plates 32, 32 are guided by guide pins 35, 36 which protrude ouwards from the frame 17, 18 respectively and are inserted into guide slots 33, 34, which are arranged horizontally and thus the disc plates 32, 32 are able to move only in the horizontal direction. Two oblique slots 37, 38 are also provided in the drive plates 32, and the ends of the sliding pins 28, 29, protruding from the guide slots 30, 31 of the frame 17, 18 are inserted into these oblique slots 37, 38. Thus the guide pins 28, 29 are located at the tops of the oblique slots 37, 38 while they are in the horizontal parts of the guide holes 30, 31 and they are located at the bottoms of the oblique slots 37, 38 when they are at the lower ends of the vertical parts of the guide slots 30, 31. Racks 39 which are cut into the bottom edges of the drive plates 32 engage with gears 40 which are supported axially on the frame 17, 18. The gears 40 are connected to a motor which is not shown in the drawing by means of gear trains which are not shown in the drawings.

Protruding pieces 41, 42 are formed respectively in the centres of the top edges of the frame 17, 18 and a guide part 43 is fixed between these protruding pieces 41, 42. Guide means, formed by two concave guides 44, 45 are formed in the ends of the guide part 43. The guides 44, 45 house vertically extending guide members 47, 48 of a pressure member support 46 so that the support 46 is able to slide up and down in the vertical direction. Furthermore a concavity 49 is formed in the top part of the guide part 43 and circular holes 50, 51 are established near to the ends of this concavity.

A pressure member 52 is arranged above and concentric with the position determining pin 16. The support 46 is U-shaped, the members 47, 48 being limbs of said support. A transverse portion 53 of said support is jutting out towards the frame 17, 18 on the outer perimeter of the pressure member 52. The ends of the transverse portion 53 are provided with the guide members 47, 48 so as to engage in the guides 44, 45 of the guide part 43. Furthermore rods 54, 55 are arranged on the top of the portions 53 and these rods fit freely into circular holes 50, 51 in the guide part 43. Springs 56, 57 are located around the rods 54, 55 between the lower surface of the guide part 43 and the transverse portion 53. The support 46 is thus urged elastically towards the player body by these springs 56, 57. Convex parts 58, 59 are formed at the bottoms of the guide members 47, 48 at both ends of the portions 53 so as to make contact with the tops of the L shaped guides 21, 22 on the loading support 19. Hence the support 46 is always pressing the loading support 19 downwards because of the presence of the two springs 56, 57 and when the support 19 is being lowered onto the player body along the vertical parts of the guide slots 30, 31 the support 46 also descends along with the support 19. Thus, when the disc 24 in the holder 23 is loaded onto the turntable 15 with the position determining pin 16 inserted concentrically, a magnet 60 of the pressure member 52 is able to hold the disc 24. Moreover there are provided rollers 61 and 62 for feeding the holder 23 onto the loading support 19.

The operation of the player 10 is described below.

The disc holder 23 which houses the disc 24 is fed from the elevator 13 onto the loading support 19, sliding along the top of the support 19 until its front end makes contact with the stopper 20. As the gears 40 are rotated by the motor (not shown in the drawings), via the gear trains (not shown in the drawings), the rotation of the gears 40 is transmitted to the racks 39 and thus the drive plates 32 are moved in the direction of the arrow A from the position shown by the solid lines in FIG. 6. As the drive plates 32 move, the sliding pins 28, 29 reach the bends of the guide slots 30, 31 (the position shown by the dotted lines in FIG. 6) and by this time the holder 23 has emerged from between the rollers 61, 62 and is able to move vertically. During this time the convex parts 58, 59 of the support 46 have been sliding on and pressing down strongly on the top surfaces of the L-shaped guides 21, 22 as a result of the force of the compressed springs 56, 57.

Figure 6:
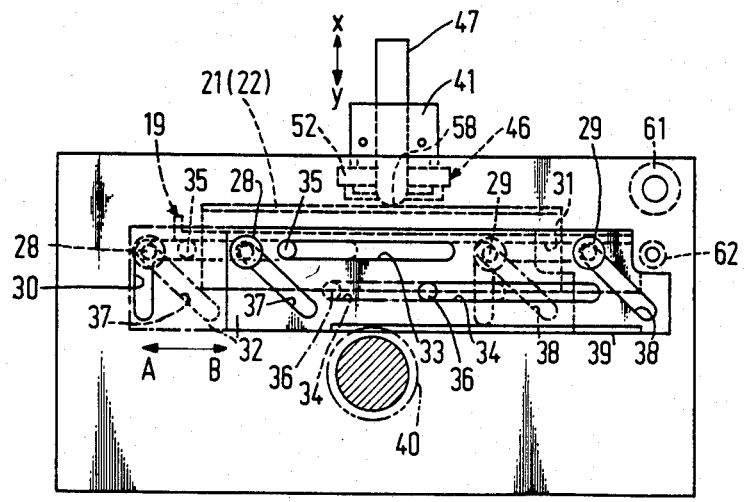
FIG. 6 is a side view, showing the loading device at the start and in an intermediate stage respectively of the loading operation.
Figure 7:
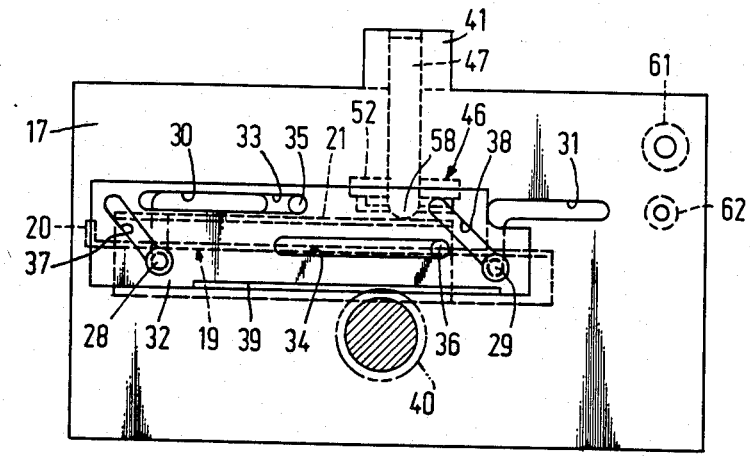
FIG. 7 is a side view, showing the loading device at the end of the loading operation.
Figure 8:
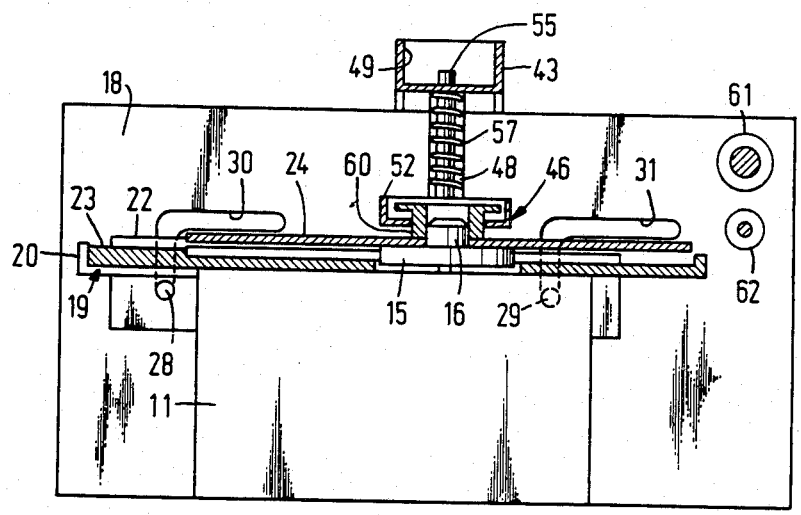
FIG. 8 is a sectional view similar to FIG. 5 but on enlarged scale, showing the loading device at the end of the loading operation.

When the sliding pins 28, 29 enter the vertical parts of the guide slots 30, 31, the compressed springs 56, 57 of the support 46 are pressing downwards to the player body 11 side and the loading support 19 is pressed to the player body 11 side by the support 46 and descends together with the support parts 46 (arrow y in FIG. 6). As a result of this the holder 23 descends the disc 24, which is housed in the holder 23, is centered by the pin 16 and loaded onto the turntable 15 and the magnet 60 of the pressure member 52 then holds in the operative position the disc 24. Furthermore the holder, which is loaded on the loading support 19 descends further. Then, when the pins 28, 29 reach the bottom ends of the vertical parts of the guide slots 30, 31 in the situation as shown in FIG. 7 and FIG. 8, a switch is closed (not shown in the drawings), the turntable is rotated and the disc player starts its reproducing action.

When the player has finished its reproducing action, the drive plates 32 are moved in the direction of the arrow B by running the motor in reverse direction and the sliding pins 28, 29 are pushed upwards by the oblique slots 37, 38 and the loading support 19 is pushed upwards against the force of the springs 56, 57 in the direction of arrow x. The magnet 60 of the pressure member 52 separates from the disc 24 and the holder 23 lifts the disc 24 from the pin 16. So the support 19 is returned to the position shown by the dotted lines in FIG. 6. At this time the support 46 has returned to its original position. Then the support 19 is moved in the direction of the arrow B with the convex parts 58, 59 of the support 46 sliding on the upper surfaces of the L-shaped guides 21, 22. At this time the holder 23 is inserted between the rollers 61, 62 and moved to the elevator 13 side. Thus the sliding pins 28, 29 and the drive plates 32 are restored to the positions shown by the solid lines in FIG. 7.

By using the loading device 12 cooperating with the support 46, the movement of the pressure member 52 relative to the player body is linked with the loading of the disc holder 23. So an accurate vertical movement of the member 52 is obtained. Further the extent of the movement of the pressure member is minimized and the space, required for the pressure member can be reduced. Furthermore there is very little noise during the pressure member operation and the magnitude of the shock caused by this operation can be reduced.

What is claimed is:

1. A disc player having a turntable for rotating information discs and a loading device for loading said information discs on said turntable, said loading device comprising:

a frame, said frame at least in part enclosing said disc player; and a loading support for supporting said disc during transport of said disc to said turntable, said loading support being movable in directions both parallel and transverse to the rotating axis of said turntable to transfer said disc to said turntable for rotation therewith; and said disc player comprising:

a pressure member and a pressure member support, said pressure member being mounted on said pressure member support, said pressure member being positioned in opposition to said turntable on said disc player, said pressure member support bearing against said loading support of said loading device;

spring means for urging said pressure member support to bear against said loading support, a sliding contact being maintained between said loading support and said pressure member support permitting relative motion between them in said transverse directions; and guide means rigidly connected to said frame for guiding movement of said pressure member in said directions parallel to the rotating axis of said turntable, and for maintaining said pressure member opposite said turntable, said pressure member following motions of said loading support in the directions parallel to said turntable axis under the urging of said spring means, said pressure member pressing on a disc loaded into said turntable by said loading support.

2. A disc player and loading device as claimed in claim 1, wherein said pressure member support includes slide members extending parallel to said turntable axis, said slide members being slidably guided by said guide means connected to said frame.

3. A disc player and loading device as claimed in claim 2 wherein said pressure member support is U-shaped, said pressure member being mounted on the transverse portion of said U-shaped support, said slide members being the arms of said U-shaped support member and extending from said transverse portion, extensions of said slide members proximate the connection between said slide members and said transverse portion being extended to make said contact with and bear upon surfaces of said loading support.

4. A disc player and loading device as claimed in claim 3 and further comprising rods extending parallel to said turntable axis and mounted on said transverse portion of said U-shaped support, and wherein said spring means comprise springs positioned around said rods and compressed between a fixed portion connected to said frame and said pressure member support, the force of said compressed springs driving said pressure support member against said loading support.

5. A disc player and loading device as claimed in claim 3 wherein said extensions of said slide members for making contact with said loading support are convex.

6. A disc player and loading device as claimed in claim 1, wherein said turntable axis is vertical.

7. A disc player and a loading device as claimed in claim 6, and further comprising a disc carrier, said disc carrier supporting an information disc from below said disk, said loading support being adapted to hold said disc carrier with said disc in a horizontal positioin, said loading support transporting said disc and said disc carrier to a position where said disc is centered over said turntable.

8. A disc player and a loading device as claimed in claim 1, wherein said pressure member support bears continuously against said loading support.

* * * * *